June 7, 1932.  L. STRNAD  1,862,324
JUNCTION BOX AND COVER
Filed Sept. 17, 1928
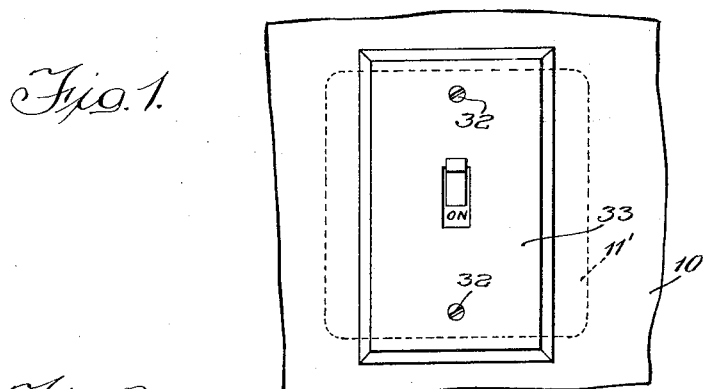
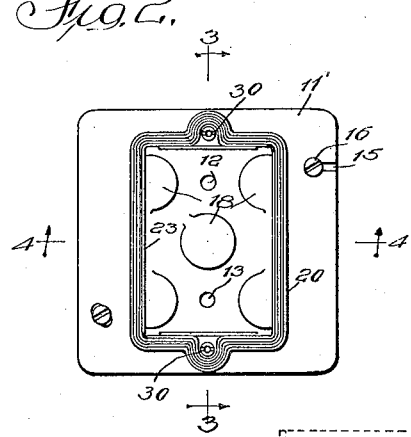
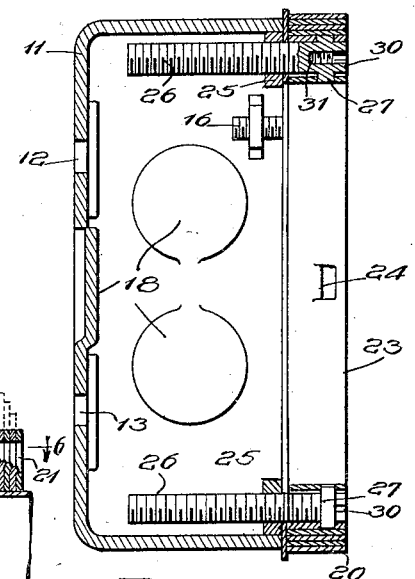
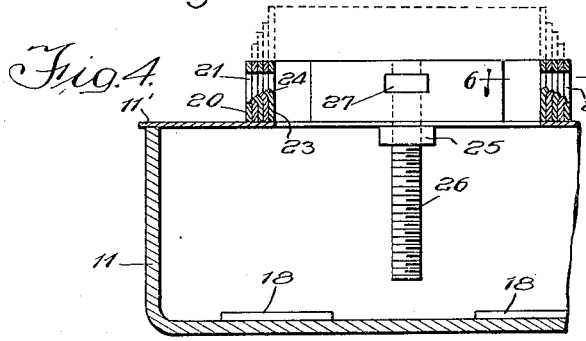
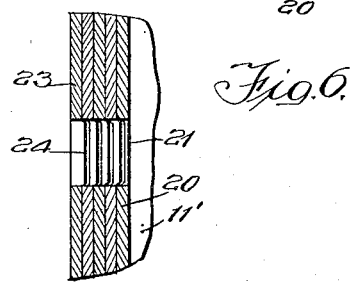
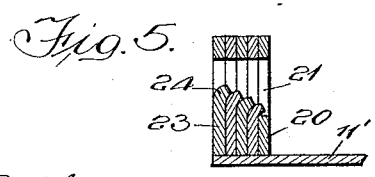
Inventor:
Louis Strnad Patented June 7, 1932

1,862,324

UNITED STATES PATENT OFFICE

LOUIS STRNAD, OF CHICAGO, ILLINOIS

JUNCTION BOX AND COVER

Application filed September 17, 1928. Serial No. 306,386.

My invention relates to electrical appliances and has to do more particularly with mountings for connecting switches and plugs to junction boxes.

The devices which are commonly used for housing the ends of electrical conduits and are mounted in a wall are ordinarily subjet to the following objections: The boxes are usually mounted in the course of building prior to the application of plaster to the wall, and inasmuch as they are often inaccurately placed or the plaster is applied either carelessly or not according to the specifications, the junction box covers are frequently found to be not flush with the plaster after the wall has been completed. Such a condition is obviously unsightly.

An object of my invention, therefore, is to provide a junction box cover which is adjustable in order that the cover plate may always be flush with the wall.

A further object of my invention is to provide such a device in which the face plate may be adjusted a plurality of predetermined distances from the box in order that the plate may be positioned flush with the wall regardless of how great a discrepancy may exist between the plane of the wall and the plane originally contemplated therefor.

Many other objects and advantages of the construction herein shown and described will be obvious to those skilled in the art from the disclosure herein given.

To this end my invention consists in the novel construction, arrangement and combination of parts hereinafter shown and described and more particularly pointed out in the claims.

Referring now to the drawing forming a part of this specification:

Fig. 1 shows a front elevation of a device embodying my invention with plaster and a face plate applied thereto;

Fig. 2 is a similar view with the plaster and face plate removed;

Fig. 3 is a sectional view taken on the line 3—3 of Fig. 2;

Fig. 4 is a sectional view taken on the line 4—4 of Fig. 2;

Fig. 5 is a detailed sectional view on an enlarged scale of the device embodying my invention; and Fig. 6 is an enlarged detailed section taken on the line 6—6 of Fig. 4.

My device is adapted to be mounted in a wall 10 and comprises a casing 11, commonly known in the electrical trade as a 1900 box. This box is provided with a number of screw holes 12 and 13 for mounting the box on studding or the like. A cover plate 11' is provided having an elongated opening 14 and a slot 15 for the reception of screws 16 or the like for securing the cover plate to the box. A plurality of circular depressions 18, commonly known in the electrical trade as "knock-outs" are provided in the box, to be knocked out by the electrician for the passage of electrical conduits into the box.

Integral with the plate 11' is a flange 20 substantially rectangular in shape and having slots 21 on opposite sides thereof. Telescoping within the flange 20 is a plurality of plates 23 similar to the flange 20 and having apertures registering with the apertures 21. However, the plates 23 are bent as shown at 24 adjacent the apertures 21, so that they interlock in telescopic relationship. The interlocking plates 23 and flange 20 are provided to form an adjustable extensible member closing the space between the plate 11' and the wall plate 33. Mounted on the cover plate 11' is a pair of apertured lugs 25 which may if desired be stamped from the plate 11', in which are threaded screws 26 and journaled on the screws 26 is a pair of collars 27 secured to the innermost plate 23. As will be clearly seen in Fig. 3, the screws 26 are slotted as indicated at 30 and are also interiorly threaded as shown at 31. The face plate 30 is secured to the 1900 box by means of screws 31 threaded into the screws 26.

In the operation of my device, the 1900 box 11 is secured to studding or the like by screws or other suitable means and the plate 11' is then attached thereto by means of the screws 16. After the plaster has been applied to the wall, assuming that it extends beyond the junction box, a screw driver or other suitable tool is inserted in the slots 30 of the screws 26 and the screws turned, thus moving by means of the collars 27 the innermost plate 23 outwardly from the box. It will be seen that the innermost plate 23 may be moved outwardly until the bent portion 24 engages the adjacent plate 23. If this distance is insufficient to bring the outside of the box or the face plate 30 flush with the plaster, the screw may be rotated further and thus the other plates 23 may separately be engaged by the bent portions 24 of the adjacent plates until all four of the movable plates have been moved out to the positions shown in dotted lines in Fig. 4. It will thus be seen that, regardless of the position of the face plate, the box is substantially inclosed, in view of the interlocking arrangement of the plates 23 and flange 20.

Obviously, I am not limited to the number of plates shown but may use any convenient number, and furthermore, the dimensions of these plates and of the slots 21, governing the distance by which the plates may be moved out from the box, may be varied as desired.

When the plates 23 have been moved out to the desired position, and the necessary wiring has been accomplished, the face plate 30 may be attached by means of the screws 31 engaging the interior of the screws 26, and the job is then completed.

Having thus described my invention, it is obvious that various immaterial modifications may be made in the same without departing from the spirit of my invention; hence I do not wish to be understood is limiting myself to the exact form, construction, arrangement and combination of parts herein shown and described, or uses mentioned.

What I claim as new and desire to secure by Letters Patent is:

1. In a substantially enclosed device of the class described, a member attachable to a junction box, and means associated with said member and forming a part of the enclosure for supporting a cover plate, said means comprising a plurality of telescoping members each having a slot in registry with a corresponding slot in an adjacent member, one wall of each of said slots projecting into the adjacent slot for the purpose described.

2. In a substantially enclosed device of the class described, a member attachable to a junction box, and means associated with said member and forming a part of the enclosure for supporting a cover plate, said means comprising a plurality of telescoping members each having a plurality of slots in registry with corresponding slots in adjacent members, the lower wall of each of said slots projecting into an adjacent slot for the purpose described.

3. An extensible member for closing the space between a junction box and a wall plate, said box having a front opening and said member consisting of an annular slotted flange bounding said opening and a plate telescoping the flange, said plate having an extension forming a stop member projecting into the slot in the flange, and means holding said plate in adjustable spaced apart relation to said box, said means operable to move said plate towards and away from said box.

4. An extensible member for closing the space between a junction box having a front opening and a wall plate covering said opening, said member consisting of an annular flange bounding said opening and a plate telescoping said flange, said plate and flange each having a slot in registry with the corresponding slot in the other when said member is retracted, the rear bounding wall of the slot in said plate projecting into the slot in the flange, and a rotatable threaded rod holding said plate in adjusted spaced apart relation to said box, said rod operable on rotation to move said plate away from and towards said box.

5. An extensible member for closing the space between a junction box having a front opening and a wall plate covering said opening, said member consisting of an annular flange bounding said opening and a plurality of telescoping annular plates arranged in closely spaced relation to said flange, said plates and flange each having a slot in registry with the other slots when said member is retracted, the rear bounding wall of the slot in each of said plates projecting towards the flange and into the next adjacent slot, and a plurality of threaded rotatable rods holding said inner plate in adjustable spaced apart relation to said box, the rotation of said rods operating to move said inner plate towards and away from said box.

6. An extensible member for closing the space between a junction box having a front opening and a wall plate covering said opening, said member consisting of an annular flange bounding said opening and a plurality of telescoping annular plates arranged in closely spaced relation to said flange, said plates and flange each having a slot in registry with the other slots when said member is retracted, the rear bounding wall of the slot in each of said plates projecting towards the flange and into the next adjacent slot, and a plurality of threaded rotatable rods holding said inner plate in adjustable spaced apart relation to said box, the rotation of said rods operating to move said inner plate and rods outwardly and inwardly relative to said box and means detachably fastening said wall plate to the outer end of said rods.

7. An extensible member for closing the space between a junction box having a front opening and a wall plate covering said opening, said member consisting of an annular flange bounding said opening and a plurality of telescoping annular plates cooperating with said flange, said plates and flange each having a slot in registry with the other slots when the member is retracted, the rear bounding wall of the slot in each of said plates projecting towards the flange and into the next adjacent slot and a plurality of threaded rotatable rods holding the plate most remote from said flange in adjustable spaced apart relation to said box, the rotation of said rods operable to move said remote plate towards and away from the box, the outer ends of said rods each having a threaded socket and screw bolts connecting said wall plate with said extensible member, said bolts threaded into said sockets.

In testimony whereof, I have hereunto signed my name.

LOUIS STRNAD.